Inventor
Henry H. Talboys
by Parker & Carter
Attorneys

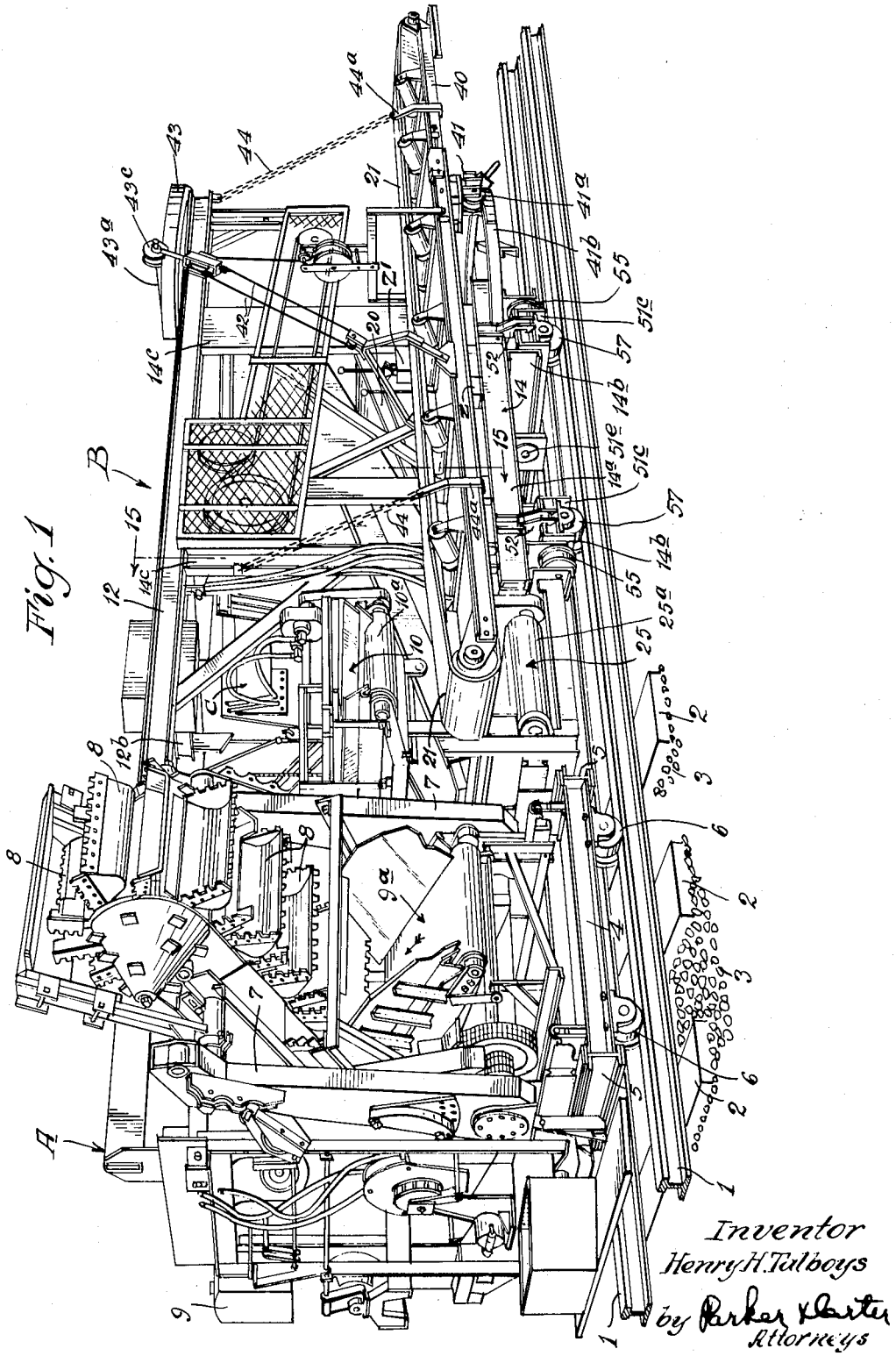

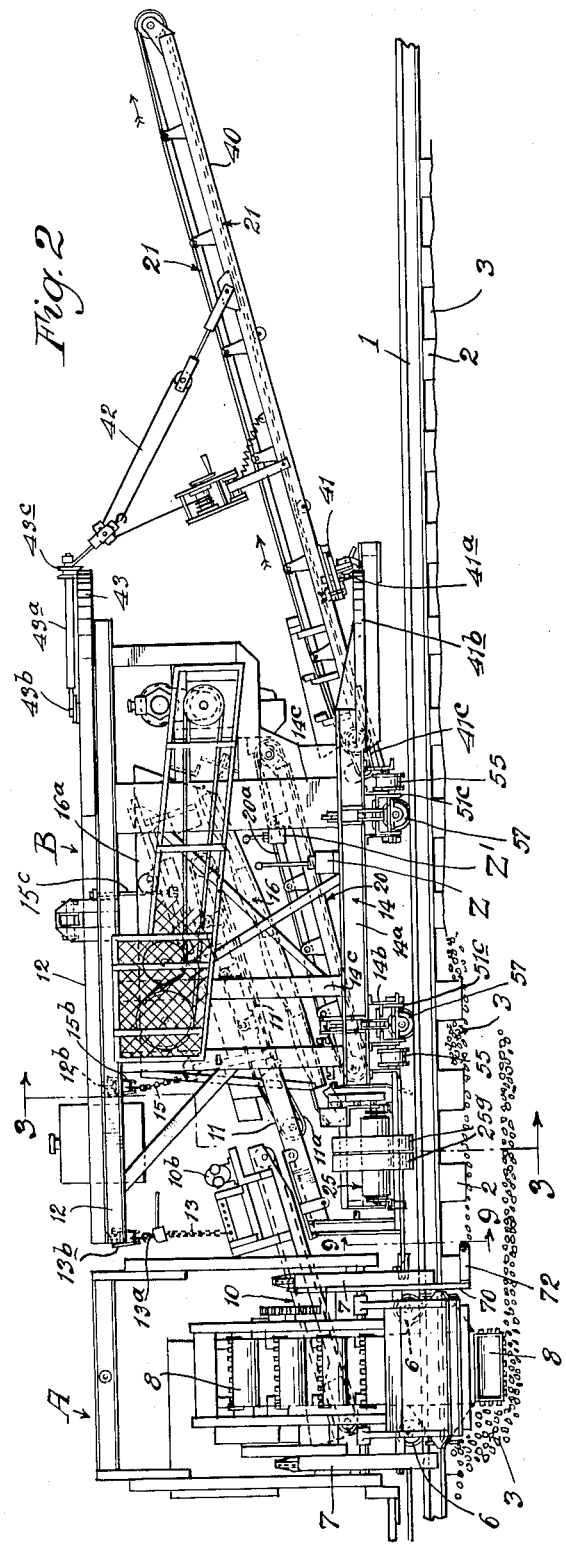

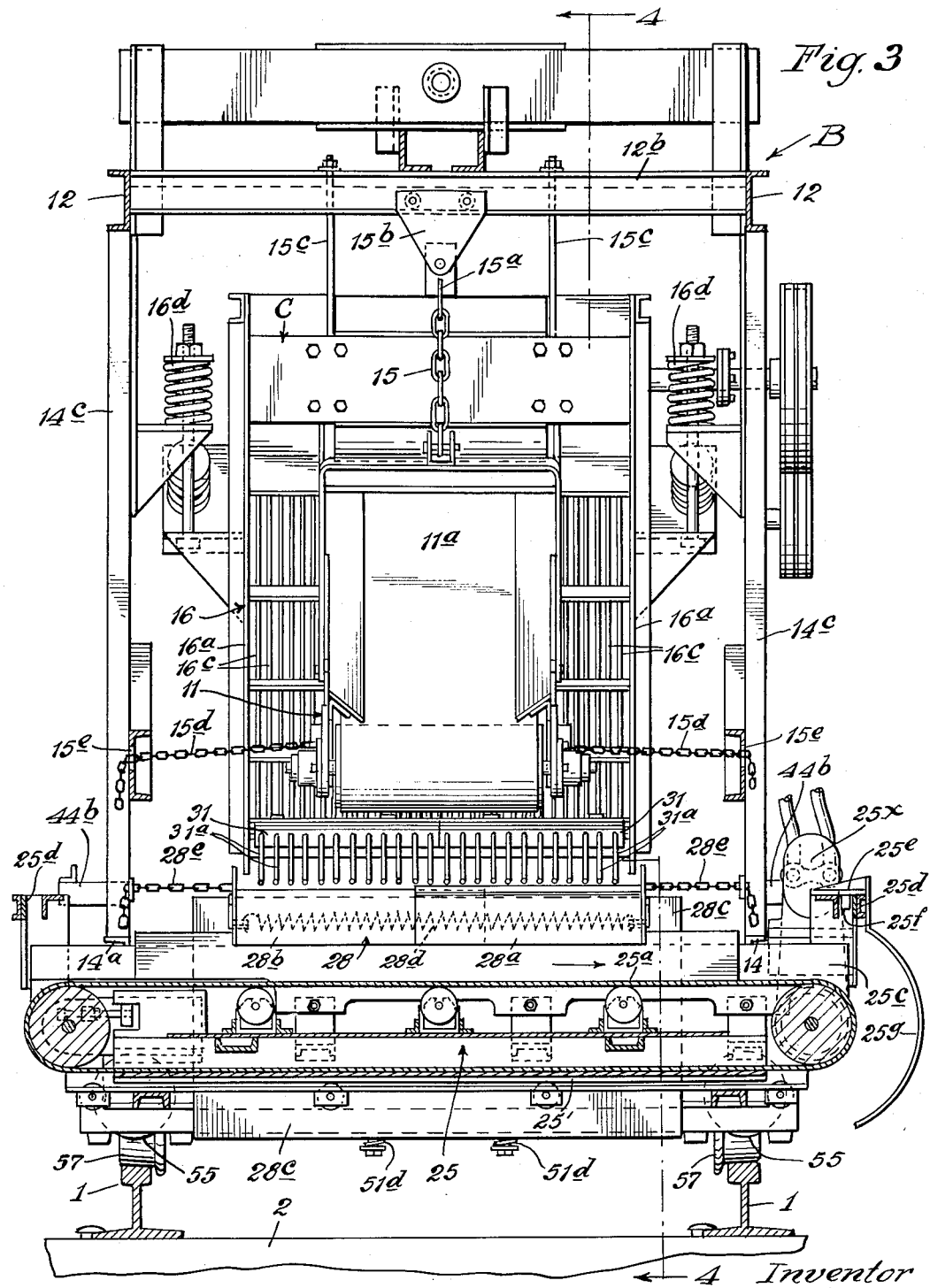

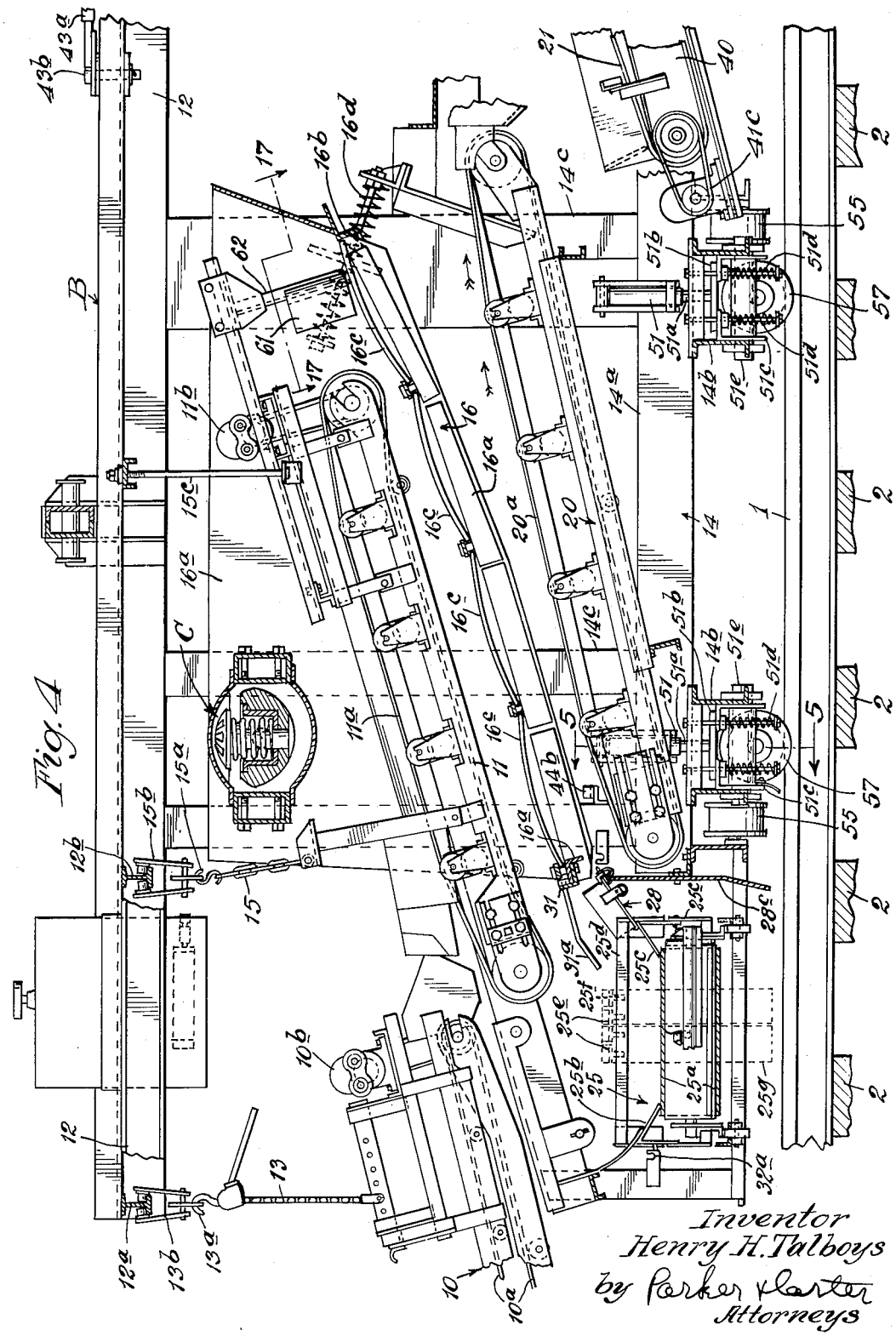

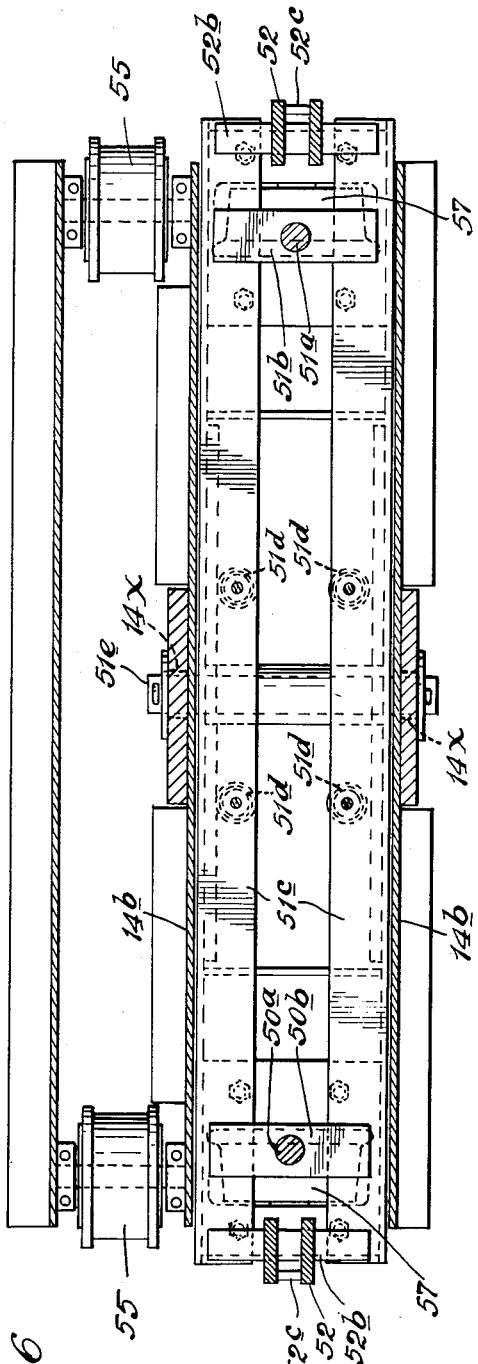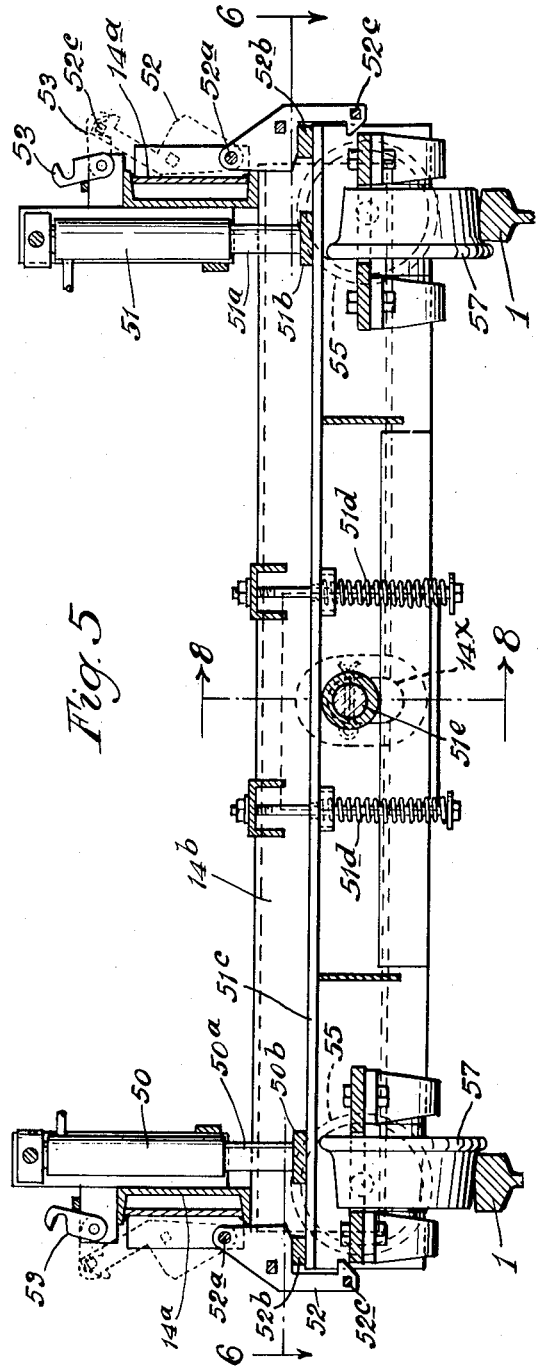

Feb. 14, 1956    H. H. TALBOYS    2,734,730
SCREENING ASSEMBLY FOR SCREENING AND RETURNING RAILWAY BALLAST
Filed Aug. 11, 1950    10 Sheets-Sheet 7
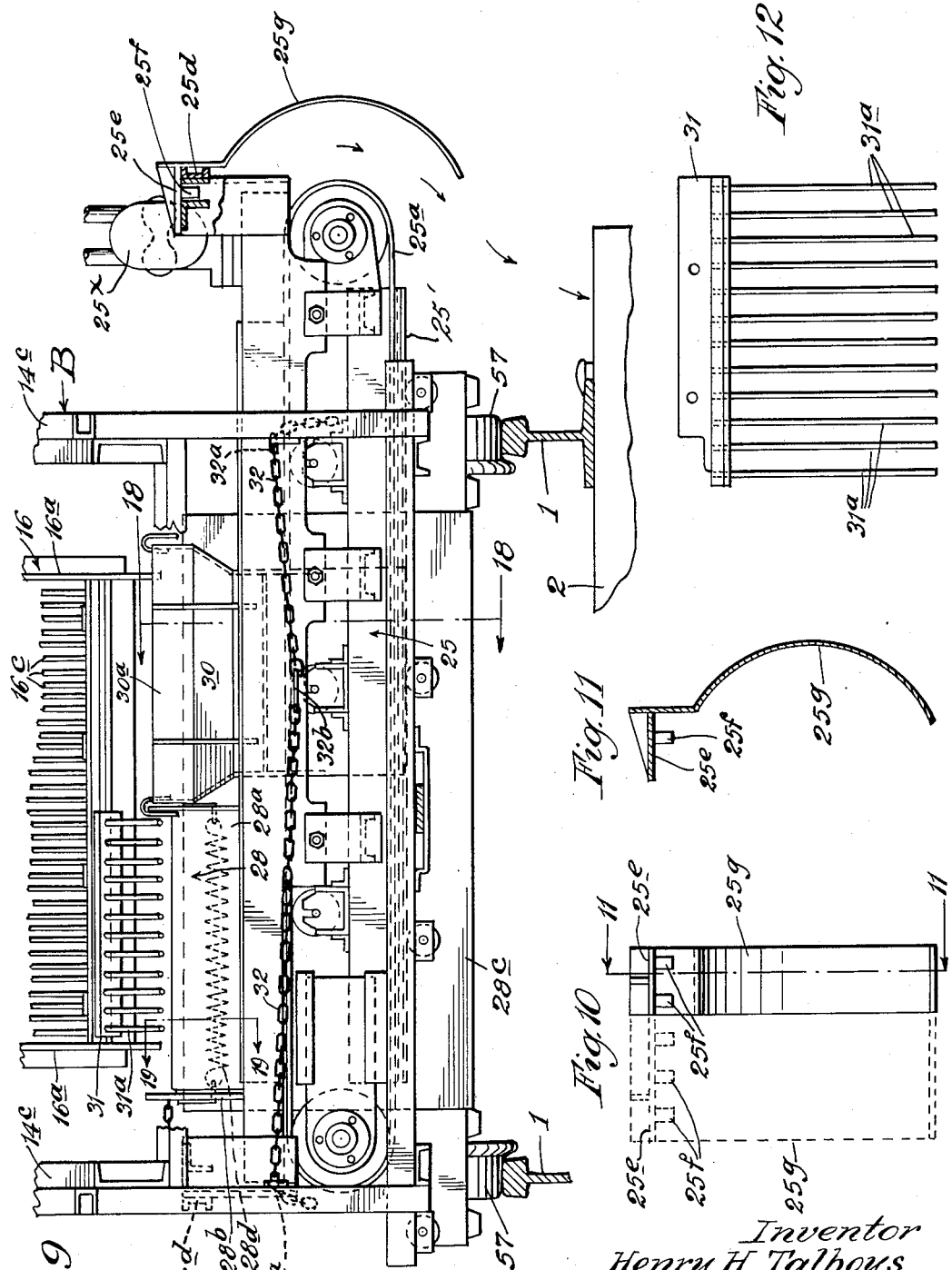

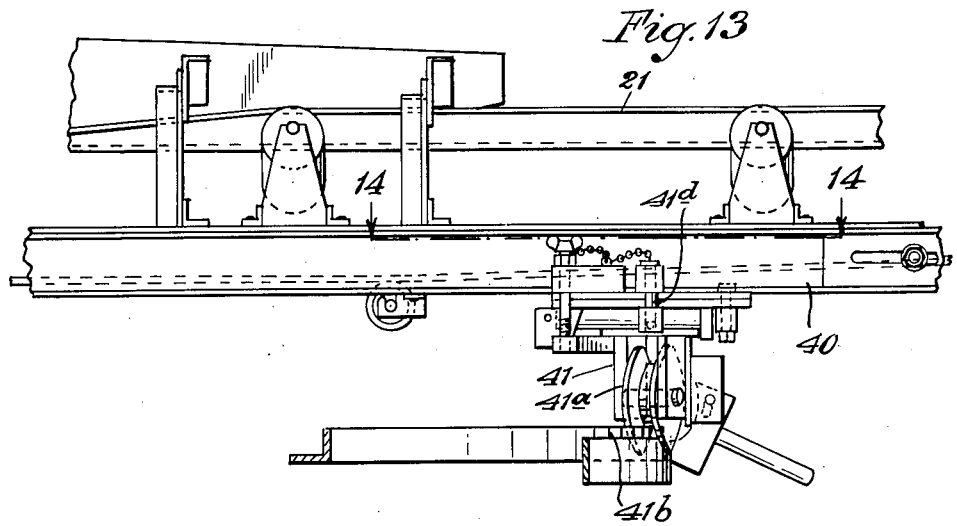
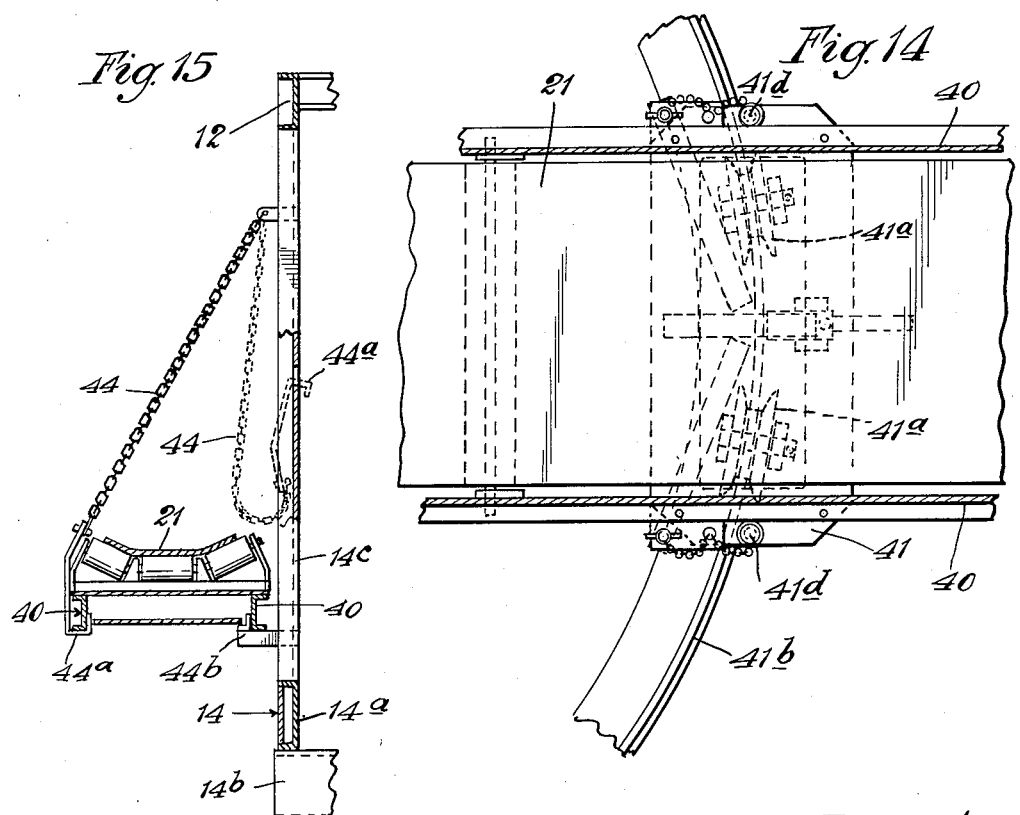

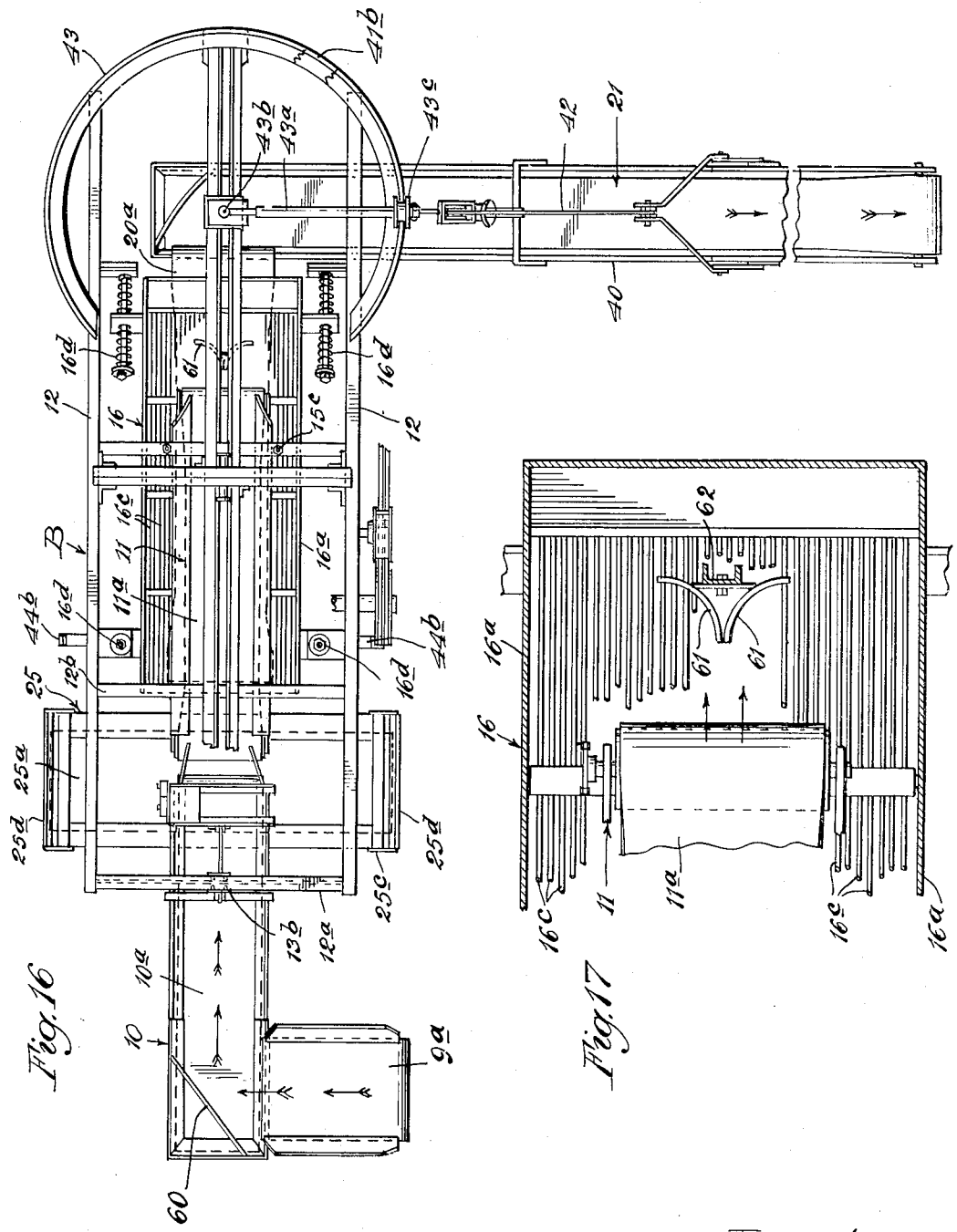

Feb. 14, 1956     H. H. TALBOYS     2,734,730
SCREENING ASSEMBLY FOR SCREENING AND RETURNING RAILWAY BALLAST
Filed Aug. 11, 1950     10 Sheets-Sheet 10
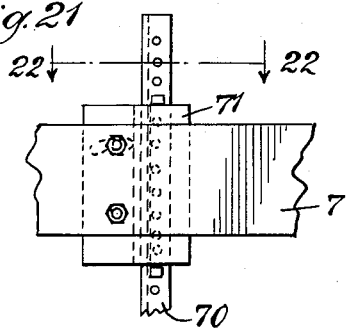
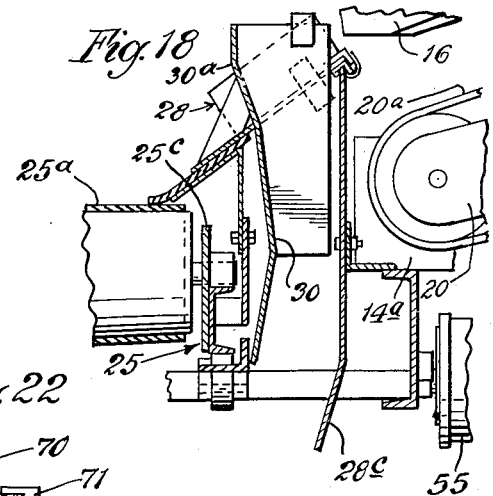
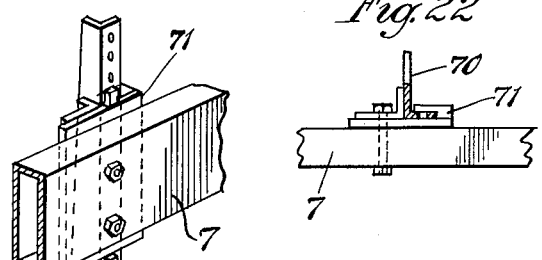
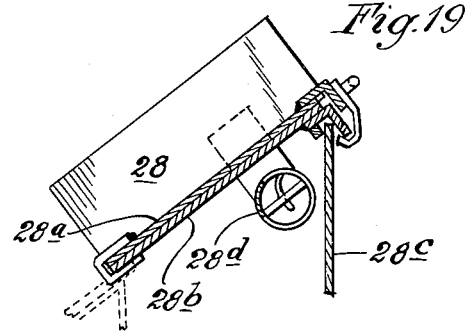
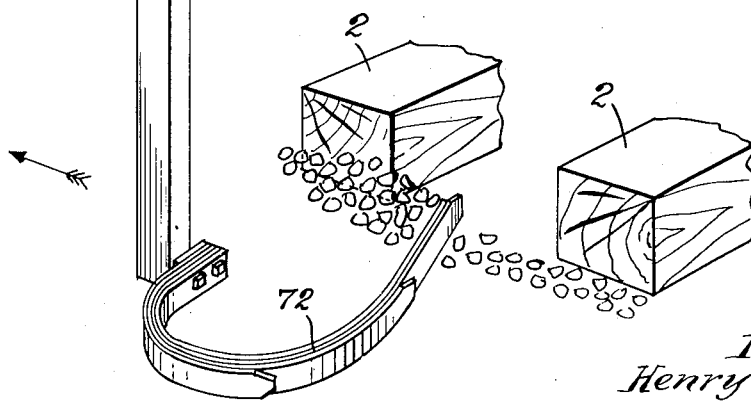
Inventor
Henry H. Talboys
by Parker & Carter
Attorneys United States Patent Office 2,734,730
Patented Feb. 14, 1956

2,734,730

SCREENING ASSEMBLY FOR SCREENING AND RETURNING RAILWAY BALLAST

Henry H. Talboys, Milwaukee, Wis., assignor to Nordberg Manufacturing Company, Milwaukee, Wis., a corporation of Wisconsin Application August 11, 1950, Serial No. 178,821

7 Claims. (Cl. 262—2)

My invention relates to an improvement in ballast cleaning and handling equipment and has for one purpose to provide a unit which excavates and cleans dirty ballast from the right-of-way and returns to the right-of-way only cleaned ballast.

Another purpose is to provide such a unit in which cleaned ballast may be returned to the right-of-way either between the rails or outside of the rails.

Another purpose is to provide a ballast cleaning mechanism which wastes the fines to a point or zone exterior to the right-of-way.

Another purpose is to provide a ballast excavating and cleaning unit which includes adequate screening means.

Another purpose is to provide means for adjusting and controlling the level of the main frame of the unit.

Another purpose is to provide improved means for varying and controlling the zone or zones of delivery of the cleaned ballast to the right-of-way.

Another purpose is to provide improved take-off means for such a unit, for removing it from the track.

Another purpose is to provide improved scraper means for loosening the material at the tie ends.

Another purpose is to provide improved means for delivering cleaned ballast exteriorly of the rails.

Another purpose is to provide improved means for delivering cleaned ballast to the space between the rails.

Another purpose is to provide improved means for segregating parts of the delivered cleaned ballast, whereby a controlled proportion may be delivered to the road bed between the rails, while a controlled proportion may be delivered exteriorly of the rails.

Other purposes will appear from time to time in the course of the specification and claims.

I illustrate the invention more or less diagrammatically in the accompanying drawings, wherein:

Figure 1 is a perspective view of the unit in position to be conveyed or transported along the rails of a track;

Figure 2 is a side elevation of the unit, illustrating the unit in operative position;

Figure 3 is a section on the line 3—3 of Figure 2;

Figure 4 is a section on the line 4—4 of Figure 3;

Figure 5 is a section on the line 5—5 of Figure 4;

Figure 6 is a section on the line 6—6 of Figure 5;

Figure 9 is a transverse section on the line 9—9 of Figure 2;

Figure 10 is a detail of the deflector mechanism;

Figure 11 is a section on the line 11—11 of Figure 10;

Figure 12 is a detail;

Figure 13 is a partial side view of one of the conveyors employed and its supporting means;

Figure 14 is a section on the line 14—14 of Figure 13;

Figure 15 is a section on the line 15—15 of Figure 1 with parts omitted;

Figure 16 is a diagrammatic plan view with parts omitted;

Figure 17 is a section on the line 17—17 of Figure 4;

Figure 18 is a section on the line 18—18 of Figure 9 with parts omitted;

Figure 19 is a section on the line 19—19 of Figure 9;

Figure 20 illustrates in perspective a scraper structure operable against the tie ends;

Figure 21 is a detail of the structure shown in Figure 20;

Figure 22 is a section on the line 22—22 of Figure 21; and

Figure 23 is a detail.

Like parts are indicated by like symbols throughout the specification and drawings.

Figure 7:
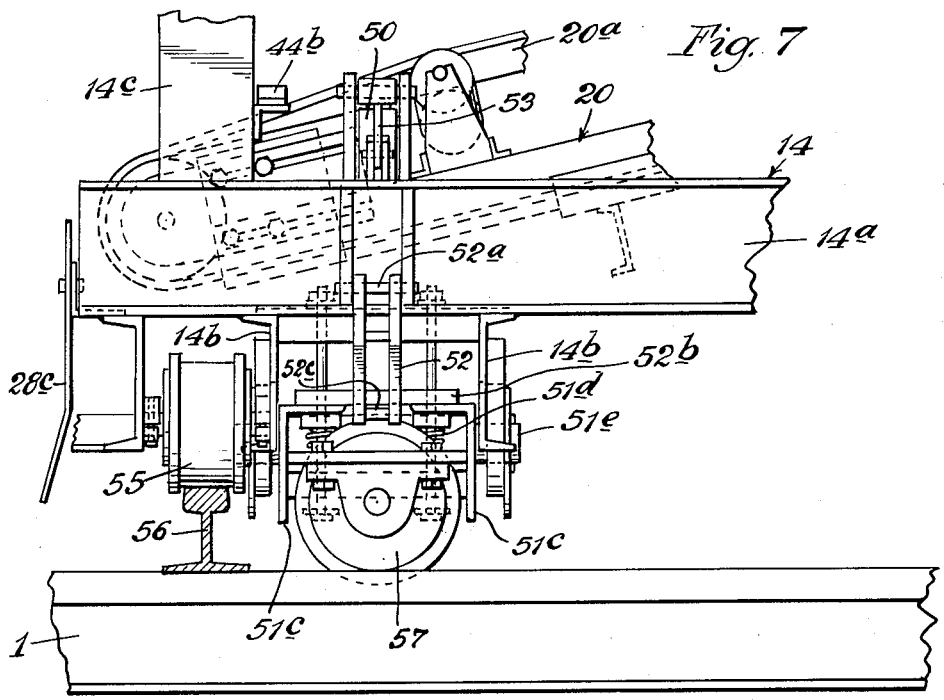
Figure 7 is an end view of the members illustrated in Figures 5 and 6.

Referring to the drawings, 1 indicates track rails supported by the usual ties 2, and 3 indicates the ballast. Referring initially to Figure 1, I illustrate an assembly which includes a ballast excavator generally indicated at A and a screening assembly generally indicated at B. The ballast excavator A is generally similar to the structure of copending application Serial No. 787,318, for adjustable deflector arrangement for ballast excavators, filed in the United States Patent Office November 21, 1947, now U. S. Patent No. 2,697,290, issued on December 21, 1954, and assigned to the assignee of the present application.

Considering first the ballast excavator, it includes any suitable frame having longitudinal members 4 and transverse members 5. It is movably supported on the rails of the track, for example, by flanged wheels 6. Since the details of the ballast excavator do not of themselves form part of the present invention, they will not be completely described herein.

7 is any suitable excavator boom, shown in Figure 1 as in the elevated or inoperative position. It will be understood that in use the boom 7 is suitably lowered to the excavating position in which it is shown in Figure 2. Its buckets 8 are then effective to pick up excavated material from the right-of-way exterior to the outer ends of the ties 2. As the assembly is slowly moved along the rails, by any suitable conveying means, not herein shown, a trench is dug outside of the tie ends to a depth below the bottom surface of the ties 2. Any suitable motor 9 may be employed to actuate the conveyor buckets 8 which may, for example, be connected to a chain drive. When the boom 7 is in the excavating position of Figure 2 and the buckets are moved downwardly and outwardly through the ballast, they are filled with dirty ballast which is dumped upon the ballast conveyor illustrated, for example, at 9a in Figure 1. This conveyor is driven or actuated to move the material in the direction of the arrow of Figure 1 for delivery to a longitudinal conveyor, below described as the first conveyor, and thence to a second conveyor. However, I shall first describe the screening unit B, upon which the first conveyor is mounted.

Referring to the position of the parts in Figure 2, the buckets 8 are lifting material and depositing it upon the ballast conveyor 9a which, in turn, deposits the material upon the first or number 1 conveyor 10, the discharge end of which overlies the number 2 conveyor indicated at 11. In Figure 1, the conveyor 10 is shown in a transporting position wherein the conveyor extends transversely of the track. It will be understood that the number 1 conveyor, when the unit is in use, extends longitudinally along and above the track, as shown in Figure 2. The upper outer end may then be suspended from the upper frame work 12 of the screening unit B. It may, for example, be flexibly suspended by any suitable chain 13. The unit B is shown as including an upper frame portion 12 and a lower frame portion 14, the two being connected by any suitable upwardly extending frame elements 14c. Specifically, the bottom frame 14 is shown as including longitudinally extending members 14a resting upon transversely extending members or channels 14b. The upper frame is shown as including transverse members or tracks in the form of I-beams 12a and 12b, which serve as supports for the adjacent ends of the number 1 conveyor 10 and the number 2 conveyor 11. Since the details of the conveyors do not of themselves form part of the present invention, they will not be fully described herein. I illustrate, however, conveyors which include suitable frames upon which endless belts 10a and 11a respectively are driven by any suitable motors 10b and 11b. As will be clear from Figure 4, the supporting chain 13 is hooked, as at 13a, to a wheeled support 13b, which is transversely adjustable along or movable along the top frame element 12a. The conveyor 11 is supported at its discharge end by rods 15c from the frame 12. The lower end of the conveyor 11 is supported by a flexible element or chain 15, which is removably hooked, as at 15a, to the wheeled element 15b, which is transversely movable along the track or support 12b. Chains 15d, as shown in Figure 3, are adapted to hold conveyor 11 against lateral movement, and may be adjustably held in notches 15e in adjacent frame elements. Thus when the buckets 8 are excavating, the excavated material is delivered by the endless belt 10a to the endless belt 11a. The conveyor 11 is shown as aligned above a screen unit generally indicated as 16. Conveyor 11 includes any suitable spring-supported side frame members 16a, transversely extending frame members 16b, and a series of groups of screening rods 16c. Spring supports 16d are shown in Figures 3 and 4. It will be understood, however, that the details of the screen may be widely varied; what is important is that a vibratory screen of proper capacity be aligned beneath the number 2 conveyor 11. A suitable vibrating unit is shown at C in Figure 4, with a drive which need not be described. Thus, as will be clear from Figure 4, the number 2 conveyor 11 delivers the excavated material to the upper end of the screen 16. Any suitable means for vibrating the screen may be employed, and as the material flows downwardly to the left, over the screen 16, referring to the position of parts as shown in Figure 4, the undersize material passes through the screening element 16c and the oversize material passes downwardly over the end of the screen.

The undersize material is received by what I shall call the number 3 conveyor 20. This conveyor may include the endless belt 20a and any suitable motor means for driving it. The material is moved by the belt 20a in the direction of the arrows of Figure 4 and is delivered thereby to the number 4 or waste conveyor 21, the details of which will later be described. It will be understood that the waste conveyor which receives the undersize material is so adjusted as to drop the undersize material to one side of the right-of-way. However, the oversize material which passes to the end of the screen is received by what I shall call the number 5 conveyor 25. The conveyor which is preferably reversibly driven includes an endless belt indicated at 25a. This belt forms the moving bottom of a hopper or trough shown as divided by overlying and downwardly converging plates or elements 25b, 25c. The trough thus formed is open at its ends.

The oversize material from the screen constitutes material which may be advantageously returned to the right-of-way. Some of it may be delivered to the space between the rails. Some may be delivered to the inter-tie space exterior to the rails. The operator may wish it delivered along the right-of-way outwardly beyond the tie ends. Let us assume that the conveyor belt 25a is being rotated in the direction of the arrows of Figure 9.

It will be observed that the conveyor 25 includes a transversely movable frame structure, generally indicated as 25', which has at each end a longitudinally extending end support or bar structure 25d. On this bar structure I may position a removable and longitudinally slidable top support 25e, which is shown as having lugs 25f extending downwardly between the elements of the bar structure 25d. 25g constitutes a curved deflector mounted on the top member 25e. When such a deflector is positioned in the line of delivery of the belt 25a, the material received by the belt from the screen 16 is delivered in the direction of the arrows of Figure 9. If the deflector 25g were of sufficient width to receive the feed of the entire width of the belt 25a, then all of the material would be delivered to a space immediately outside of the rails but between the tie ends. However, as will be clear from Figure 10, I may use one or more narrow members 25g, which will intercept only a limited amount of the feed delivered by the belt 25a. I can thus vary and determine the proportion of delivery of the oversize material to the area just outside of the rail, and the area farther outside of the rail. In Figure 10, I illustrate in dotted line a larger member 25g. It will be understood that the users of my screening device may have several such members of different widths so that, by changing the number used or by selecting the proper widths, they can adjust or control the amount of material intercepted. The material which is not intercepted is thrown by the belt 25a outward beyond the tie ends. In Figure 4, I illustrate two of the members 25g which together intercept about one-half of the feed of the belt. This is merely ilustrative of one method of control.

If the operator wishes to permit some of the material to drop into the inter-rail space, it is necessary to prevent such material from reaching the belt 25a. In Figure 9 I illustrate, for example, a method of insuring that part of the delivery of the screen 16 will reach the belt 25a while part will not. 28 indicates an adjustable inclined chute which receives the oversize material from the screen and delivers it toward the belt 25a. As shown in Figure 23, it may be made in two telescoping parts or plates 28a and 28b. Each plate or part has flanges or angles overlying the generally vertical plate 28c, which extends along substantially the whole width of the frame. The spring 28d normally urges the plates together but they may be adjusted to any width, for example by chains 28e.

30 illustrates a hopper or a combined hopper and baffle structure which may be supported beneath the discharge end of the screen 16. The hopper 30 has a wall 30a extending into the line of delivery of material from the screen 16. Any of such material which enters the hopper 30 is concentrated by the walls of the hopper 30 to drop into the inter-rail area. In Figure 9, I illustrate an inter-rail arrangement in which the member 30 receives approximately half of the feed from the screen 16. A movable and removable screen extension 31 is illustrated as located to one side of the hopper-baffle structure 30. It includes prongs 31a of substantially wider clearance than the screen elements 16c. It is effective to insure that the discharge from the screen 16 reaches the center of the belt 25a and results in a substantially even loading of the belt 25a.

Thus, with the hopper 30 in the position shown in Figure 9, a predetermined proportion of the oversize or relatively coarse particles of ballast is delivered to the space between the rails while the remainder delivered from the discharge end of the screen 16 is delivered over the surface of plate 28 to belt 25a. The hopper 30 may be removed and the plate 28 extended as shown in Figure 3 so that the plate 28 receives coarse particles over the entire discharge end of the screen and delivers these particles to the belt 25a for ultimate discharge over the area existing outwardly of the track rails.

As will be clear from a comparison of Figures 3 and 9, the conveyor frame 25c is adjustable transversely of the screening unit B. This, in connection with the reversibility of the belt 25a, enables material to be delivered at either side of the right-of-way. However, the parts will normally be in intermediate position, as shown in Figure 3, when the device is out of use and is being moved along the rails. Any suitable reversible motor 25x may be employed to actuate the belt 25a. In moving or adjusting the conveyor frame 25c, I may conveniently employ chains 32, links of which may be dropped in any suitable securing notches 32a, the chains being dead-ended as at 32b, or suitably secured at other points to the frame 25c.

I have herein alluded to the fact that the discharge from the number 3 conveyor is received by the number 4 waste conveyor. The number 4 waste conveyor, indicated at 21, is carried on a discharge boom structure, generally indicated at 40. The discharge boom is shown as having a truck or carriage 41, upon which are wheels 41a riding on an arcuate track 41b, which forms part of or is secured to the lower frame element or portion 14 of the screening unit B. The carriage 41 is intermediate the ends of the boom 40, but is nearer the lower or inner end than it is to the upper or outer end, as will be clear from Figure 2. The inner end of the boom is free and carries any suitable belt or conveyor driving member 41c, for the belt or conveyor 21. In the use of the device, the lower, inner end of the boom, and thus of the waste conveyor number 4, is beneath the number 3 conveyor 20 and thus receives the undersize material discharged by the screen 16. This material is conveyed by the belt 21 in the direction of the arrows of Figure 2 and is deposited preferably at a distance or away from the right-of-way or at least from the track being cleaned. The position of the boom 40, and thus of the area of spoils discharged, is easily controlled by moving the carriage 41, with its rollers 41a, about the arcuate track 41b. At the same time, the boom supporting tension assembly, generally indicated at 42, is swung around the upper arcuate track 43 to accommodate itself to the position of the boom. While the boom may be supported in any suitable way, I illustrate a supporting bar 43a, pivoted as at 43b and having a roller 43c movable about the arcuate track 43 mounted on or forming part of the upper frame element or assembly 12. It will be further understood that the boom 40 and the carriage 41 are relatively rotatable about one of the pins 41d, when the other is removed. Thus the boom 40 may be swung into the sidewise position in which it is shown in Figure 1 and in Figure 15, the parts being appropriately positioned for conveyance of the assembly along a track. When in such position, the boom 40 is shown as swung around on the carriage 41, so that what is normally the upper, outer discharge end of the boom 40 is located adjacent that end of the screening unit which is closest to the ballast excavating unit A. With the parts in this position, the carriage 41 is moved to adjacent one end of the arcuate track 41b and the boom may be anchored or held in position for example by the chains 44, having hooks 44a which are hooked around one of the channels of the boom 40. The other channel is supported by a bracket 44b on one of the vertical frame members 14c. Similar securing means are provided at the opposite side of the screening assembly.

It is important that the screening and conveying assembly or unit B be mounted in proper horizontal level during operation. For example, when the device is operating on a curve, and the opposite rails are at different levels, it is important to hold the screen bed level. In order to obtain this result, I have provided an assembly of hydraulic cylinders arranged in pairs at opposite sides of the unit B. Referring for example to Figures 4 and 5, I illustrate pairs of cylinders 50, 51, such cylinders being suitably mounted upon the lower frame portion or assembly 14, or upon the longitudinally extending frame elements 14a. In order to adjust the base frame portions, generally indicated as 14, in relation to the carriages or trucks 51c, I provide pistons 50a and 51a in the cylinders 50 and 51, which bear against any suitable abutment elements or plates 50b and 51b respectively on the transverse truck elements 51c, normally upwardly urged by springs 51d. As shown in Figure 5, these springs will lift the truck structures as high as the slot 14x permits. The truck elements 51c ride between the transverse frame members 14b. The pin 51e connects the members 14b and acts as a pivot, and rides in the elongated vertical slots 14x in the members 14b. With reference to Figure 5, if the right-hand rail is at a level higher than the left-hand rail then, in order to maintain the screen bed level, the left-hand pistons 50a should be subjected to hydraulic pressure and should be moved downwardly in the cylinder 50. The result will be slightly to tilt the entire frame structure of the unit B. The operator can control the tilt by controlling the amount of movement of the pistons 50a and he can thereby level the screen bed. At the same time a release of pressure in the cylinders 51 may be employed to permit a corresponding upward movement of the pistons 51a in the cylinders 51. Pressures may be controlled by the manually actuated pump Z through the control box Z', as shown in Figure 2.

In the normal use of the device, I employ limit hooks 52, pivoted as at 52a in relation to the side frame members 14a. When the hooks are in the full line position of Figure 5, their hook ends are spaced downwardly below limit elements 52b associated with the transverse or truck members 51c. When the parts are in the position of Figure 5, portions of the hook structures actually engage the upper surface of the members 52b. There is sufficient play, however, so that although the hooks serve as limits to permit a substantial relative upward movement of the side frame members 14a and the transverse frame members 14b, in relation to the carriage elements 51c, the hooks 52 may be moved to the inoperative or dotted line position of Figure 5, and may be held in the inoperative position by pivoted latches 53, which may engage cross bars 52c of the hook structures.

Since the trackworking equipment herein described is used on tracks which carry traffic, it may from time to time be necessary rather quickly to remove the unit from the rails to permit the passage of a train. I therefore provide a plurality of run-off wheels 55 which are shown, for example, in Figures 4, 5, 6 and 7, which are suitably mounted to rotate about horizontal axes extending longitudinally of the rails. As is clear, for example from Figure 4, the run-off wheels 55 are spaced substantially above the plate or the rail tops and do not interfere with the normal movement of the screening mechanism along the rails. Any suitable cross or take-off rails may be positioned upon the main rails 1. For example, I illustrate in Figures 7 and 8 the take-off rails 56. These rails may be removably positioned upon the track rails 1 in alignment with the take-off wheels 55. It then becomes necessary to elevate the entire structure in order to withdraw the main flanged supporting wheels 57 from the rails 1.

Figure 8:
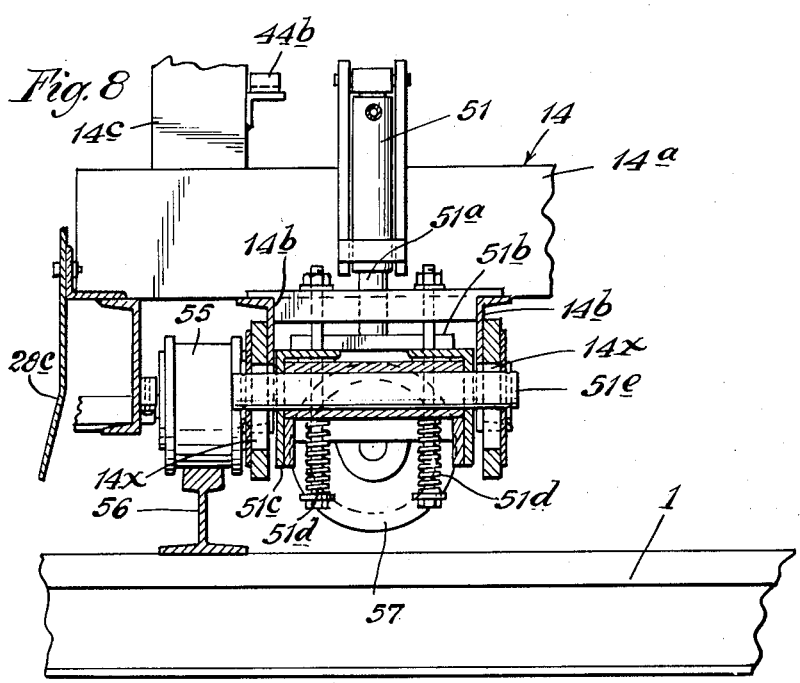
Figure 8 is a section on the line 8—8 of Figure 5, with the parts in take-off position.

Pressure is introduced into the cylinders 50, 51, as shown in Figure 5, to raise the whole frame or unit B. The take-off rails 56 are then positioned on the track rails, as shown in Figure 8, beneath the run-off or take-off wheels 55. Pressure is then released from the cylinders and the springs 51d are then effective to raise the member 51c and the flanged wheels 57 from the track rails 1 to the position shown in Figure 8.

Figures 20 and 22 indicate a scraper for clearing along the tie ends. A bar 70 is vertically adjustable in a support or holder 71, secured for example to the boom structure 7. It carries a multi-leaf scraping spring 72, secured as shown in Figure 20 and of adequate strength. When the excavating boom 7 is in its lowered or excavating position, the scraper 72 engages the tie ends and deflects ballast material away from the tie ends, thus supplementing the bucket conveyor.

It will be realized that, whereas, I have described and claimed a practical and operative device, nevertheless many changes may be made in size, shape, number and disposition of parts without departing from the spirit of my invention. I therefore wish my description and drawings to be taken as in a broad sense illustrative or diagrammatic, rather than as limiting me to the precise structures herein described and shown. It will be understood, for example, that a variety of screening and conveying mechanisms may be employed. However, I have illustrated a practical and operative structure.

The use and operation of the invention are as follows:

A major purpose is to provide a screening and cleaning assembly which may practically be used to clean ballast along a railroad right-of-way, returning cleaned ballast to the right-of-way and delivering outwardly away from the right-of-way the unusable material. It will be understood that the assembly herein described and shown may be used in connection with additional excavating equipment, but it constitutes an assembly which may advantageously be used as a unit.

With reference, for example, to Figure 1, the complete assembly is shown as consisting of a ballast excavating unit A and a screening unit B. The ballast excavating unit includes the buckets 8 which, when the parts are in the excavating position shown in Figure 2, excavate ballast from along the right-of-way exterior to the tie ends. This dirty ballast is delivered from the unit A to the number 1 conveyor of the screening unit B. Without going into detail through the various steps earlier described, the waste is delivered by the number 4 conveyor, indicated at 21 in Figure 2. The conveyor may be positioned at a variety of angles in relation to the right-of-way and is preferably shown inclined to the track so as to deliver the undersize material from the screen at a point substantially radially removed from the right-of-way. The usable or oversized material is, at the same time, delivered to the right-of-way, either between the rails or just exterior of the rails. The entire unit is moved progressively along the rails by any suitable conveying means and, in effect, the buckets 8 cut a trench exterior to the tie ends, which trench, if desired, may be filled or partially filled by cleaned ballast. However, as mentioned above, the operator may prefer to position all or part of the ballast between the rails.

It will be understood, of course, that the units herein described and shown can be used in cooperation with other units, such as cribbing machines, or may be used with or supplemented by direct hand labor on the right-of-way. In fact, the unit is susceptible of a widely flexible application to the problem of removing, cleaning and redepositing ballast.

A convenient method of and apparatus for conveying the herein described structure along the track rails is described and claimed in my copending application, Serial No. 178,822, filed in the United States Patent Office August 11, 1950, now Patent No. 2,684,040, issued on July 20, 1954, and entitled "Method of and Apparatus for Moving Trackworking Equipment Along the Rails of a Track."

In relation to the actual movement of material in the operation and use of my device, I have diagrammatically indicated, in Figure 16, the travel of the ballast. The ballast conveyor 9a delivers excavated material against, for example, a deflector 60 and thus upon the end of the number 1 conveyor belt 10a. As above pointed out, the discharge end of the belt 10a overlies the number 2 conveyor belt 11a which, in turn, delivers the material to the upper end of any suitable screen 16. As shown in Figure 17, I may employ a distributing deflector 61 which may be adjustably mounted in any suitable vertically extending support 62. Thus the conveyor belt of the number 2 conveyor discharges material in such fashion that it is widely and generally uniformly distributed across the width of the upper end of the screen 16. The undersize material which passes through the screen 16 is received by the endless belt 20a of the number 3 conveyor and is delivered to the waste conveyor 21 which, as shown in Figure 16, may be so positioned about the arcuate track 41b as to insure that the undesired undersize material is deposited along the line substantially outwardly away from the track. The oversize material which is to be reused is received on the endless belt 25a of the number 5 conveyor 25.

One advantage of my structure is that ballast can, if desired, be returned to the track area at the side opposite that from which it is excavated. Thus, with reference to the structure as shown in Figure 2, the buckets 8 may excavate a trench along one side of the track while the conveyor 25 may be driven in a direction to deliver the oversize material toward the opposite side of the track.

A further advantage is that when the machine stops, there is no long ditch left. That is to say, when a ditch is excavated by the buckets 8 and when material is being delivered toward the same side of the track by the conveyor 25, the ditch may be partly or largely filled. When the work is stopped, the unfilled length of ditch represents merely the distance between the point where the buckets 8 are excavating and the point where the conveyor 25 is delivering. As will be clear from Figure 2, the two points or areas are closely adjacent.

The waste conveyor may be tilted to any angle and wastes through an arc of swing of greater than 180 degrees. It can be elevated to fill cars on the track on which the assembly is working or on adjacent tracks. When it is moved into inoperative position, it is pulled up parallel with the side of the frame, where it is out of the way and is firmly supported.

I claim:

1. In a ballast handling and cleaning assembly adapted for movement along tie supported rails and having an excavating unit adapted to pick up ballast alongside the rails and deliver the ballast to a screening unit, the improvement comprising a screen having a surface allowing relatively fine particles of ballast to pass therethrough while conveying relatively coarse particles of ballast to a discharge end of the screen, conveying means extending beneath said screen for receiving and disposing of said relatively fine particles, a conveyor positioned adjacent the discharge end of said screen and extending transversely of said rails, said conveyor including an endless belt with a discharge end positioned outwardly of said rails, said conveyor being in the line of flow of relatively coarse particles of ballast from said screen while being spaced from the discharge end of said screen, and an adjustable conveying plate including a plurality of telescoping members having conveying surfaces between the discharge end of said screen and said conveyor, said members being extensible to a first position wherein their surfaces receive coarse particles from said screen over the entire discharge end of said screen and deliver coarse particles to said conveyor, said members being retractible to a second position wherein a predetermined proportion of said coarse particles may fall between the discharge end of said screen and said conveyor for deposit in the area between said rails while the remainder of said coarse particles are delivered over said plate to said conveyor for discharge by said conveyor in the area outwardly of said rails.

2. In a ballast handling and cleaning assembly adapted for movement along tie supported rails and having an excavating unit adapted to pick up ballast alongside the rails and deliver the ballast to a screening unit, the improvement comprising a screen having a surface allowing relatively fine particles of ballast to pass therethrough while conveying relatively coarse particles of ballast to a discharge end of the screen, conveying means extending beneath said screen for receiving and disposing of said relatively fine particles, a conveyor positioned adjacent the discharge end of said screen and extending transversely of said rails, said conveyor including an endless belt with a discharge end positioned outwardly of said rails, said conveyor being in the line of flow of relatively coarse particles of ballast from said screen while being spaced from the discharge end of said screen, a hopper between the discharge end of said screen and said conveyor and a member having a conveying surface extending between said discharge end and said conveyor, said hopper and member being positioned alongside one another and having a combined dimension such as to receive coarse particles over the entire discharge end of said screen, said hopper having a surface positioned in the line of flow of coarse particles from said discharge end for intercepting a predetermined proportion of coarse particles and delivering them downwardly to the area between said rails while said member delivers coarse particles to said conveyor for discharge in the area outwardly of said rails.

3. The structure of claim 1 characterized by and including a deflector positioned outwardly of the discharge end of said conveyor and in the line of flow of ballast therefrom, said deflector being effective to force a predetermined proportion of ballast downwardly along the ends of said ties.

4. The structure of claim 2 wherein said endless belt is reversibly driven to thereby allow selective discharge therefrom at either side of said rails.

5. The structure of claim 2 characterized by and including means between the discharge end of said screen and the conveyor for delivering coarse particles from the screen substantially uniformly over the width of the conveyor.

6. The structure of claim 2 wherein a removable deflecting member is positioned outwardly of the discharge end of said conveyor and in the line of flow of particles therefrom.

7. A ballast cleaning and handling assembly including a ballast excavating unit mounted for movement along rails supported by ties and a screening assembly adapted to receive ballast from said excavating unit and separate the ballast received into relatively coarse particles and relatively fine particles, delivery means associated with said screening means and adapted to selectively deliver the coarse ballast particles along and between said ties, said assembly including a spring member positioned forwardly of said delivery means and rearwardly of said unit, said member extending transversely to the tie end faces, said member having a flat end positioned to contact the end faces of said ties and scrape ballast away from the end faces of said ties during said excavating and screening operation.

References Cited in the file of this patent

UNITED STATES PATENTS

| | | |
|---|---|---|
| 619,443 | Smith | Feb. 14, 1899 |
| 865,261 | Mehaffey | Sept. 3, 1907 |
| 892,406 | Converse | July 7, 1908 |
| 1,035,193 | Hovland | Aug. 13, 1912 |
| 1,081,393 | Lobdell | Dec. 16, 1913 |
| 1,129,820 | Trench | Feb. 23, 1915 |
| 1,444,115 | Estergreen | Feb. 26, 1923 |
| 1,577,390 | Vang | Mar. 16, 1926 |
| 1,613,420 | Warr | Jan. 4, 1927 |
| 1,770,552 | Robb | July 15, 1930 |
| 1,778,690 | Scheuchzer | Oct. 14, 1930 |
| 2,003,606 | Protzeller | June 4, 1935 |
| 2,142,208 | Protzeller | Jan. 3, 1939 |
| 2,196,880 | Van Voorhis et al. | Apr. 9, 1940 |
| 2,300,017 | Shaffer | Oct. 27, 1942 |
| 2,309,712 | Philbrick | Feb. 2, 1943 |
| 2,500,448 | Bozarth | Mar. 14, 1950 |